E. F. SCHERMERHORN.
INSULATED RAIL JOINT.
APPLICATION FILED MAY 21, 1915.
1,152,344.
Patented Aug. 31, 1915.
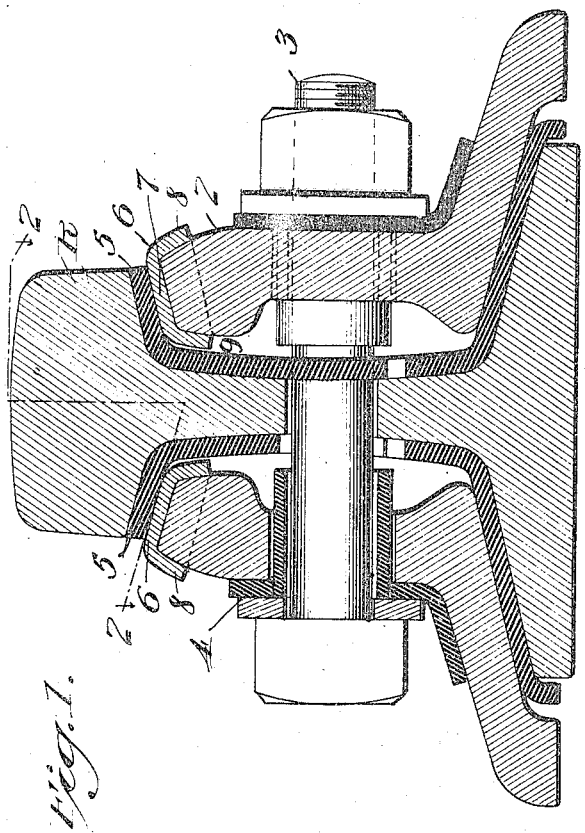
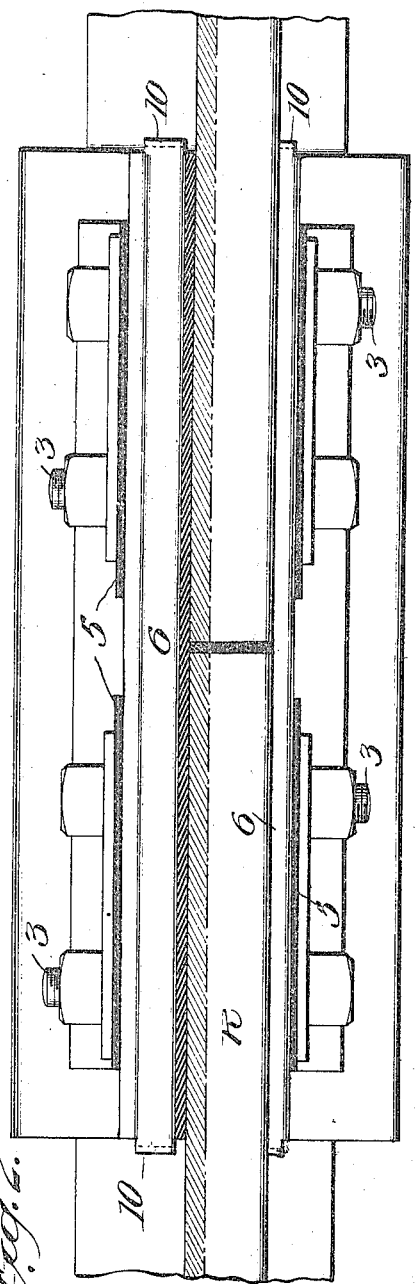
Inventor
Edwards F. Schermerhorn
Witnesses

UNITED STATES PATENT OFFICE.

EDWARDS F. SCHERMERHORN, OF BROOKLYN, NEW YORK, ASSIGNOR TO THE RAIL JOINT COMPANY, OF NEW YORK, N. Y., A CORPORATION OF NEW YORK.

INSULATED RAIL-JOINT.

1,152,344.

Specification of Letters Patent. Patented Aug. 31, 1915.

Application filed May 21, 1915. Serial No. 29,605.

*To all whom it may concern:*

Be it known that I, EDWARDS F. SCHERMERHORN, a citizen of the United States, residing at Brooklyn, in the county of Kings and State of New York, have invented certain new and useful Improvements in Insulated Rail-Joints, of which the following is a specification.

This invention relates to rail joints of the insulated type, and has particular reference to novel and practical means for protecting the insulating material at the places where it is subjected to the greatest wear.

In some forms of insulated rail joints, the insulating material is held tightly between the joint bar and the under side of the rail head. This is a conventional arrangement but exposes the insulation to rapid wear and destruction. That is largely due to the fact that with the insulation so placed it is caused, by the load pressures, to adapt itself to the slight inequalities in the adjacent metal bearing surfaces and will adhere to them, with the consequence that the various relative movements of the rail and the joint bar are communicated to the same. These movements are manifested in a series of irregularly imposed chafing, grinding, and squeezing effects, which are concentrated at certain definite spots near the ends of the rails, and this results in the tearing and crushing out of the insulation at these spots. As the destruction of the insulation at these spots progresses, the locations of extreme destructive action are transferred gradually to locations more remote from the ends of the rails, so that ultimately the whole structure of the insulation, lying between the rail head and the joint bar head, is destroyed.

Accordingly, it is the purpose of the present invention to relieve the insulation from the progressive destructive action referred to by the interposition of a metal chafing guard between the head of the joint bar and the insulation underlying the rail head, and to so construct and mount this chafing guard as to insure an efficient functioning thereof.

With these and other objects in view, the invention consists in the novel construction, combination, and arrangement of parts hereinafter more fully described, illustrated, and claimed.

The essential feature of the invention involved in the employment of a shiftable metal chafing guard in the location and combination above indicated, is necessarily susceptible of structural modification, and of application to various types of rail joints, without departing from the spirit or scope of the invention, but certain preferred and practical embodiments thereof are shown in the accompanying drawings, in which:—

Figure 1 is a cross sectional view partly in the plane of one of the bolts, and partly at one side of the plane of the same bolt. Fig. 2 is a top plan view partly in section on the line 2—2 of Fig. 1.

Similar reference characters designate corresponding parts throughout the several figures of the drawings.

In carrying forward the invention, the improvement is applicable to any type of insulated rail joint employing insulating material between the head of the joint bar and the under side of the head of the rail. It is also applicable to any form of joint or splice bar, both with and without rail base supporting flanges, so it will be understood that the invention is susceptible of a broad application to insulated rail joints of the character where it is desirable to protect the head section of insulation from the destructive effects of the wheel loads. Accordingly, for purposes of illustration, there is shown in Figs. 1 and 2 of the drawings, a conventional type of rail joint including in its organization the rails R, the opposite joint bars 2, the joint bolts 3, and suitably arranged insulating material. This insulating material, in the form of construction shown, includes bolt insulation 4 and the insulation head piece 5 underlying the head of the rail.

As herein indicated, the distinctive feature of the present invention resides in the employment of a metal chafing guard 6 in the form of a cap plate that fits and embraces the head or top portion of the joint bar 2. This cap plate in its preferable form comprises a main bearing web 7 having flat upper and lower bearing faces respectively engaging the under side of the insulation head piece 5 and the top edge of the head of the joint bar, said cap plate also including outer and inner lateral depending retaining flanges 8 and 9 which respectively fit over the outer and inner corner portions of the head of the joint bar. By reason of this formation, the cap plate snugly telescopes over the head portion of the joint bar, but the fit between these parts is sufficiently free or loose so that the cap plate is capable of an independent movement longitudinally, and this movement can be facilitated by the application of lubricants between the parts before or during assembly.

It will be observed that the outer and inner lateral flanges 8 and 9 have an engagement upon the outer and inner faces of the head portion of the joint bar and thereby retain the cap plate from outward or inward relative displacement with reference to the joint bar, while at the same time not interfering with the independent longitudinal movement thereof. With reference to the independent longitudinal movement of the cap plate, an excessive or unnecessary movement in such direction may be prevented by any suitable restraining means, such for instance as the expedient shown in the drawings, the same consisting in forming the cap plate at its ends with bent-down terminal retaining lips 10 which are disposed beyond the ends of the joint bar. Sufficient clearance is provided between the terminal retaining lips 10 and the adjacent ends of the joint bar to allow for the extent of longitudinal movement requisite for the accomplishment of the objects of the invention, while at the same time preventing an excessive movement of the chafing guard or cap plate in a longitudinal direction.

A further feature of practical importance in constructing a chafing guard in the form of a metal cap plate which conforms to the contour of the head of a joint bar, resides in the fact that by reason of such complementary relation between such plate and the joint bar head, the adjacent surfaces of these parts are maintained smooth and clean through the rubbing movement thereof, and the maintenance of this condition in turn permits and facilitates the relative movement of the two parts in the necessary directions.

From the foregoing, it is thought that the construction and many advantages of the hereindescribed improvement in insulated rail joints will be apparent to those familiar with the art without further description, and it will be understood that changes in the form, proportion, and minor details of construction, such as fall within the scope of the appended claims may be resorted to without departing from the principle or sacrificing any of the advantages of the invention.

I claim:

1. An insulated rail joint including, in combination, a rail, a joint bar, insulation between the joint bar and rail head, a metal chafing guard consisting of a cap having a web interposed between the insulation and the head of the joint bar, and outer and inner lateral depending flanges engaging over the outer and inner corner portions of the head of the joint bar.

2. An insulated rail joint including, in combination, a rail, a joint bar, insulation between the joint bar and rail head, and a metal cap plate fitting the head of the joint bar and provided with lateral terminal retaining projections.

3. An insulated rail joint including, in combination, a rail, a joint bar, insulation between the joint bar and rail head, and a metal cap plate loosely fitting the head of the joint bar and of greater length than the latter, said cap plate having terminal retaining means.

4. An insulated rail joint including, in combination, a rail, a joint bar, and a metal plate fitting the head of the joint bar and having independent longitudinal but not lateral movement therewith, and insulation between the metal plate and the rail head.

In testimony whereof I hereunto affix my signature in the presence of two witnesses.

EDWARDS F. SCHERMERHORN.

Witnesses:
KATHERINE McNALLY,
HARRY HALL.